US012535040B2

(12) United States Patent
Nakamura et al.

(10) Patent No.: US 12,535,040 B2
(45) Date of Patent: Jan. 27, 2026

(54) CONTROL APPARATUS FOR VEHICLE

(71) Applicant: Toyota Jidosha Kabushiki Kaisha, Toyota (JP)

(72) Inventors: Yoshihisa Nakamura, Okazaki (JP); Junya Ishimoto, Toyota (JP); Shogo Tanaka, Toki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 19/027,828

(22) Filed: Jan. 17, 2025

(65) Prior Publication Data

US 2025/0237180 A1 Jul. 24, 2025

(30) Foreign Application Priority Data

Jan. 19, 2024 (JP) .................. 2024-007077

(51) Int. Cl.
 *F02D 41/02* (2006.01)
(52) U.S. Cl.
 CPC .... *F02D 41/029* (2013.01); *F02D 2200/0812* (2013.01)
(58) Field of Classification Search
 CPC ........................ F02D 41/029; F02D 2200/0812
 See application file for complete search history.

(56) References Cited

FOREIGN PATENT DOCUMENTS

| JP | 2015-077860 A | 4/2015 |
| JP | 2015-183607 A | 10/2015 |
| JP | 2019-190375 A | 10/2019 |
| JP | 2023-160348 A | 11/2023 |

OTHER PUBLICATIONS

Merged copy and machine-generated translation of DE-102021128172-A1.*
Merged copy and machine-generated translation of JP-2009121561-A.*
Merged copy and machine-generated translation of KR-20210076758-A.*
Merged copy and machine-generated translation of JP-2016008517-A.*

\* cited by examiner

*Primary Examiner* — Ngoc T Nguyen
(74) *Attorney, Agent, or Firm* — Oblon, McClelland, Maier & Neustadt, L.L.P.

(57) ABSTRACT

A control apparatus for a vehicle that includes (i) drive wheels, (ii) an engine, (iii) a filter configured to collect particulate matters contained in exhaust gas of the engine, (iv) a fluid transmission device provided in a power transmission path between the engine and the drive wheels and (v) a direct clutch configured to connect between an input member and an output member of the fluid transmission device. The control apparatus includes (a) a regeneration control portion configured to execute a regeneration control for regenerating the filter, by controlling the engine such that the particulate matters collected in the filter are easily burned; and (b) a clutch control portion configured to execute a release control for placing the direct clutch into a released state when the regeneration control is being executed.

8 Claims, 2 Drawing Sheets

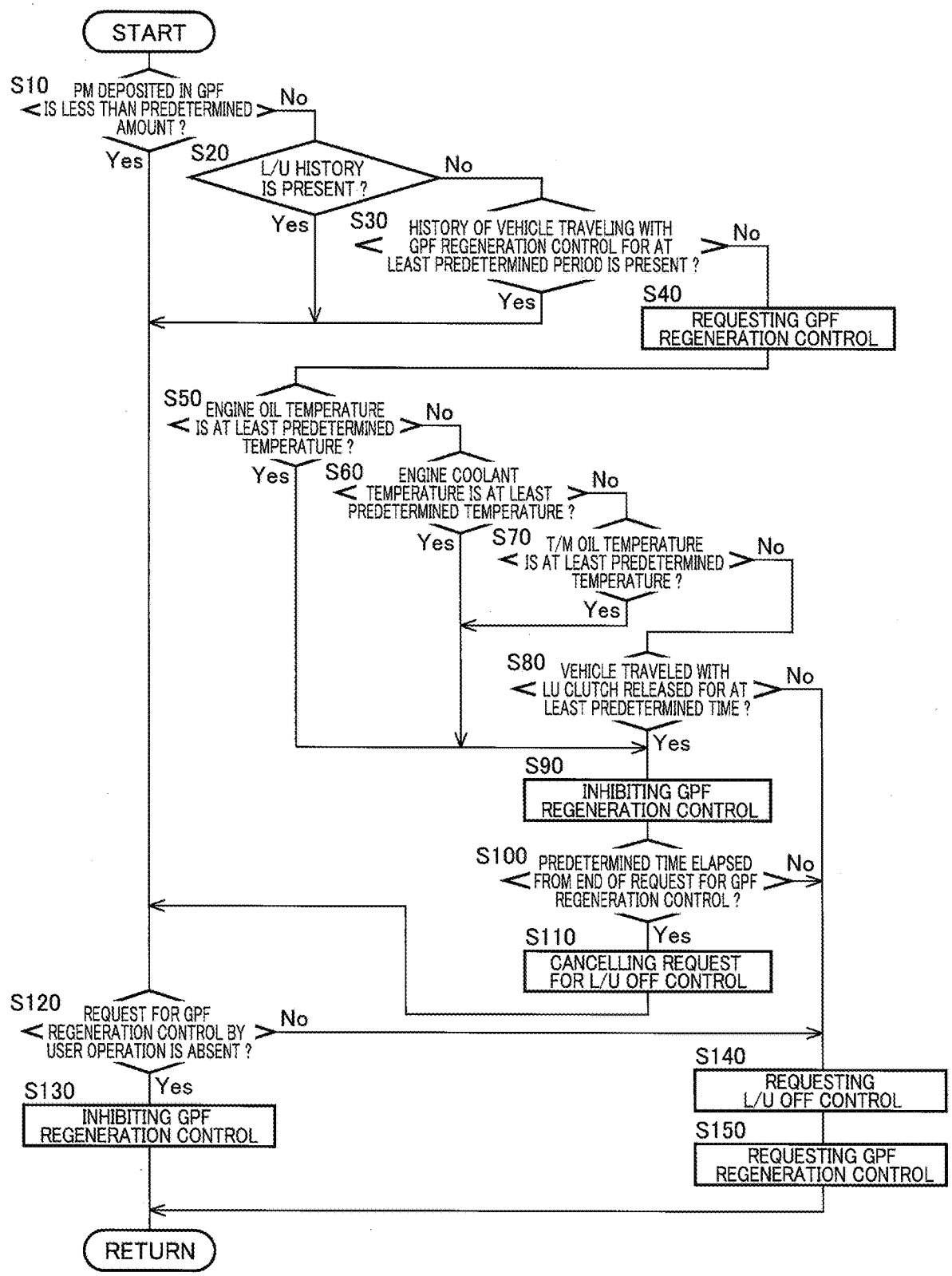

CONTROL APPARATUS FOR VEHICLE

This application claims priority from Japanese Patent Application No. 2024-007077 filed on Jan. 19, 2024, the disclosure of which is herein incorporated by reference in its entirety.

FIELD OF THE INVENTION

The present invention relates to a control apparatus for a vehicle that includes a filter for collecting particulate matters contained in exhaust gas of an engine.

BACKGROUND OF THE INVENTION

There is known a control apparatus for a vehicle that includes an engine and a filter configured to collect particulate matters contained in exhaust gas of an engine. For example, a control apparatus for an internal combustion engine described in Patent Document 1 is such a control apparatus. This patent document 1 discloses that, after the engine is started, the ignition timing is controlled to the retard side and the air-fuel ratio is controlled to the lean side, whereby the particulate matters collected in the filter is burned so as to regenerate the filter.

PRIOR ART DOCUMENT

Patent Document

[Patent Document 1]
Japanese Patent Application Laid-Open No. 2015-183607

SUMMARY OF THE INVENTION

When the engine is controlled to regenerate the filter, torque fluctuation in each combustion cycle of the engine is increased, and NV of the vehicle may be increased. The term "NV" is a general term for noise and vibration generated in the vehicle, and represents at least one of the noise and the vibration in the vehicle.

The present invention has been made in view of the above circumstances, and an object of the present invention is to provide a control apparatus for a vehicle that is capable of suppressing increase on of NV when executing a regeneration control for regenerating a filter.

The present invention provides a control apparatus for a vehicle that includes (i) drive wheels, (ii) an engine, (iii) a filter configured to collect particulate matters contained in exhaust gas of the engine, (iv) a fluid transmission device provided in a power transmission path between the engine and the drive wheels and (v) a direct clutch configured to connect between an input member and an output member of the fluid transmission device. The control apparatus includes (a) a regeneration control portion configured to execute a regeneration control for regenerating the filter, by controlling the engine such that the particulate matters collected in the filter are easily burned; and (b) a clutch control portion configured to execute a release control for placing the direct clutch into a released state when the regeneration control is being executed.

In the control apparatus according to the present invention, the release control is executed to place the direct clutch into the released state when the regeneration control is being executed to regenerate the filter. Thus, during execution of the regeneration control, a power of the engine is not rigidly transmitted through the direct clutch but is fluidly transmitted through the fluid transmission device, and torque fluctuation of the engine transmitted to a downstream side of the fluid transmission device is suppressed. Therefore, when the regeneration control for the filter is executed, increase of NV can be suppressed.

BRIEF DESCRIPTION OF THE DRAWINGS

FIG. 2 is a flowchart for explaining main parts of a control operation of an electronic control apparatus, namely, a control routine that is to be executed for suppressing increase of NV when GPF a regeneration control is executed.

DETAILED DESCRIPTION OF PREFERRED EMBODIMENT

Figure 1:
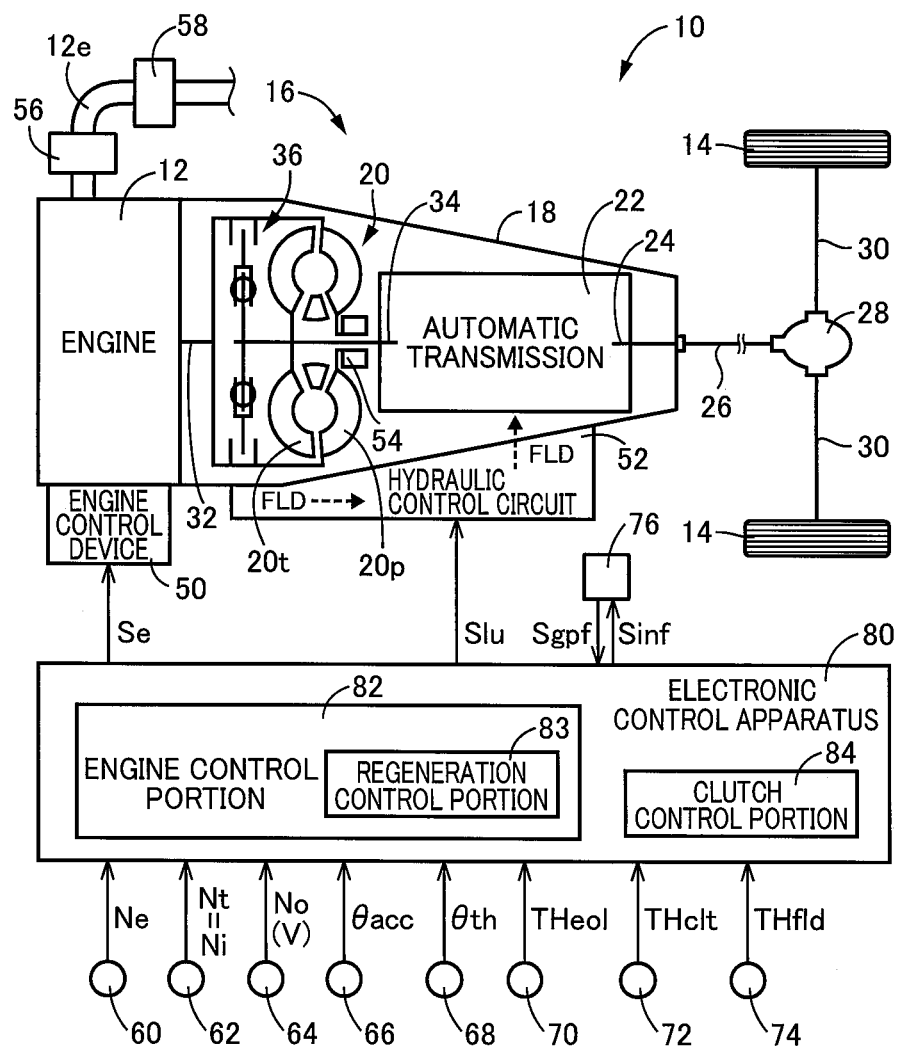
FIG. 1 is a view showing a schematic configuration of a vehicle to which the present invention is applied, and is a view showing main parts of control functions and systems for various controls in the vehicle.

Hereinafter, an embodiment of the present invention will be described in detail with reference to drawings.

Embodiment

FIG. 1 is a view showing a schematic configuration of a vehicle 10 to which the present invention is applied, and is a view showing main parts of control functions and systems for various controls in the vehicle 10. In FIG. 1, the vehicle 10 includes an engine 12 as a power source, drive wheels 14 and a power transmission device 16 that is provided in a power transmission path between the engine 12 and the drive wheels 14.

The engine 12 is a known internal combustion engine that generates power by burning a fuel, and is, for example, a gasoline engine that uses gasoline as the fuel. The vehicle 10 is provided with an engine control device 50 including an electronic throttle valve, a fuel injection device and an ignition device that are provided in the vehicle 10. The engine control device 50 is controlled by an electronic control apparatus 80 described later, whereby an engine torque Te that is a torque of the engine 12 is controlled.

The power transmission device 16 includes a torque converter 20 connected to the engine 12 and an automatic transmission 22 connected to the torque converter 20, in a casing 18 that is a non-rotating member attached to a body of the vehicle 10. The power transmission device 16 includes a propeller shaft 26 connected to a transmission output shaft 24, a differential gear device 28 connected to the propeller shaft 26 and a pair of drive shafts 30 connected to the differential gear device 28. The transmission output shaft 24 is an output rotary member of the automatic transmission 22. The power transmission device 16 includes an engine connection shaft 32 that connects between the engine 12 and the torque converter 20.

The torque converter 20 includes a pump impeller 20p connected to the engine connection shaft 32 and a turbine impeller 20t connected to a transmission input shaft 34. The transmission input shaft 34 is an input rotary member of the automatic transmission 22. The pump impeller 20p is an input member of the torque convertor 20, and the turbine impeller 20t is an output member of the torque convertor 20. The torque converter 20 is a fluid transmission device provided in a power transmission path between the engine 12 and the drive wheels 14, particularly, in a power transmission path between the engine 12 and the automatic transmission 22. The torque converter 20 transmits power of the engine 12 from the engine connection shaft 32 to the transmission input shaft 34 via a fluid.

The torque convertor 20 includes an LU clutch 36 as a direct clutch that connects between the pump impeller 20p and the turbine impeller 20t. The LU clutch 36 is a known lockup clutch, and is, for example, a hydraulic friction engagement device. A control state of the LU clutch 36 is switched by changing an LU torque Tlu, which is a torque capacity of the LU clutch 36, by an LU hydraulic pressure PRlu. The LU hydraulic pressure PRlu is a regulated engagement pressure supplied to the LU clutch 36 from a hydraulic control circuit 52 provided in the vehicle 10.

As the control state of the LU clutch 36, there are a released state (which is synonymous with a completely released state), a slipping state in which the LU clutch 36 is engaged with slipping and an engaged state (which is synonymous with a completely engaged state). When the LU clutch 36 is placed in the released state, the torque converter 20 is placed in a torque converter state in which a torque amplifying effect is obtained. When the LU clutch 36 is engaged, the torque convertor 20 is placed into a lock-up state (also referred to as a complete lock-up state) in which the pump impeller 20p and the turbine impeller 20t are integrally rotated.

The automatic transmission 22 is, for example, a known planetary-gear-type automatic transmission. The automatic transmission 22 is configured to establish any one of a plurality of shift speeds (also synonymous with gear stages) having different speed ratios (also synonymous with gear ratios) γ (=transmission input rotational speed Ni/transmission output rotational speed No). The transmission input rotational speed Ni is a rotational speed of the transmission input shaft 34 and is an input rotational speed of the automatic transmission 22. The transmission output rotational speed No is a rotational speed of the transmission output shaft 24, and is an output rotational speed of the automatic transmission 22.

The vehicle 10 includes a mechanical oil pump 54. The oil pump 54 is connected to the pump impeller 20p, and is driven and rotated by the engine 12 to discharge a working fluid FLD used in the power transmission device 16. The working fluid FLD discharged from the oil pump 54 is supplied to the hydraulic control circuit 52. The hydraulic control circuit 52 supplies the LU hydraulic pressure PRlu that is regulated based on the working fluid FLD discharged from the oil pump 54. The working fluid FLD functions as a working fluid for shifting the automatic transmission 22 and a working fluid for switching the control state of the LU clutch 36, for example.

The vehicle 10 includes a catalyst 56 and a GPF (Gasoline Particulate Filter) 58. The catalyst 56 and the GPF 58 are provided on an exhaust pipe 12e of the engine 12. The catalyst 56 is, for example, a known three-way catalyst that purifies hydrocarbons (HC), carbon monoxide (CO), nitrogen oxides (NOx) and the like contained in an exhaust gas of the engine 12. The GPF 58 is provided on a downstream side of the catalyst 56. The GPF 58 is a filter that collects particulate matters (PM) contained in the exhaust gas of the engine 12. The GPF 58 is provided in addition to the catalyst 56, so that the exhaust gas can be further purified.

The vehicle 10 further includes the electronic control apparatus 80 as a controller including a control apparatus of the vehicle 10 related to control of the engine 12 and the automatic transmission 22. The electronic control apparatus 80 includes a so-called microcomputer including, for example, a CPU, a RAM, a ROM and an input/output interface. The CPU executes various controls of the vehicle 10 by executing signal processing in accordance with a program stored in the ROM in advance while using a temporary storage function of the RAM, for example.

The electronic control apparatus 80 is supplied with various signals based on detection values from various sensors provided in the vehicle 10. The various sensors and the like are, for example, an engine speed sensor 60, an input speed sensor 62, an output speed sensor 64, an accelerator opening sensor 66, a throttle-valve opening sensor 68, an engine-oil temperature sensor 70, an engine-coolant temperature sensor 72, a working-fluid temperature sensor 74 and an information device 76. The various signals include, for example, an engine speed Ne, a transmission input speed Ni, a transmission output speed No, an accelerator opening degree θacc, a throttle-valve opening degree θth, an engine oil temperature THeol, an engine coolant temperature THclt, a working fluid temperature THfld and a GPF regeneration request signal Sgpf. The engine speed Ne is a rotational speed of the engine 12. The transmission input speed Ni is equal to a turbine speed Nt, which is an output speed of the torque converter 20. The transmission output speed No is a rotational speed corresponding to a running speed V of the vehicle 10. The accelerator opening degree θacc is an amount of an acceleration operation made by a driver of the vehicle 10, which indicates a magnitude of the acceleration operation made by the driver. The throttle-valve opening degree θth is an opening degree of the electronic throttle valve. The engine oil temperature THeol is a temperature of the lubricant oil of the engine 12. The engine coolant temperature THclt is the temperature of the coolant of the engine 12. The working fluid temperature THfld is the temperature of the working fluid FLD.

The electronic control apparatus 80 outputs various command signals to various devices provided in the vehicle 10. The devices and the like are, for example, the engine control device 50, the hydraulic control circuit 52, the information device 76, and the like. The various command signals and the like are, for example, an engine control command signal Se, an LU hydraulic pressure control command signal Slu, an information notification signal Sinf, and the like. The engine control command signal Se is a command signal for controlling the engine 12. The LU hydraulic pressure control command signal Slu is a command signal for controlling the LU clutch 36, and is a command hydraulic pressure of the LU hydraulic pressure PRlu.

The information device 76 includes, for example, a touch panel display, and is a device that notifies various kinds of information and receives operations made by the driver. The various information is, for example, information for notifying the driver that processing for regenerating the GPF 58 is necessary. The information notification signal Sinf is, for example, a command signal for displaying various kinds of information on the information device 76. The GPF regeneration request signal Sgpf is a signal that is outputted when processing for regenerating the GPF 58 is requested by a user operation (=driver operation) in the information device 76.

The electronic control apparatus 80 includes an engine control portion 82 and a clutch control portion 84 in order to realize various controls in the vehicle 10.

The engine control portion 82 calculates an amount of drive requested to the vehicle 10 by the driver by applying the accelerator operation amount θacc and the running speed V to a required drive amount map, for example. The required drive amount map is a relationship for obtaining a required drive amount, which is obtained and stored in advance experimentally or by design, for example, that is, which is determined in advance. The required drive amount is, for example, a request drive torque Trdem, a request drive force Frdem or the like in the drive wheel 14. The engine control portion 82 outputs an engine control command signal Se for controlling the engine 12, to the engine control device 50 so as to obtain a required engine torque Tereq for realizing the required drive amount, which is calculated in consideration of a transmission loss, an auxiliary load and the speed ratio γ, for example.

The clutch control portion 84 determines a control region by using, for example, a predetermined lockup region diagram, and outputs the LU hydraulic pressure control command signal Slu for controlling the LU clutch 36, to the hydraulic control circuit 52 such that a control state corresponding to the determined control region is realized. When the clutch control portion 84 determines that the control region is an engaged region, the clutch control portion 84 places the LU clutch 36 into the engaged state. On the other hand, when the clutch control portion 84 determines that the control region is a released region, the clutch control portion 84 places the LU clutch 36 into the released state. On the other hand, when the clutch control portion 84 determines that the control region is a slipping region, the clutch control portion 84 sets the LU clutch 36 to the slipping state.

Here, when a large amount of collected PM is deposited in the GPF 58, a filtering performance of the GPF 58 is lowered due to clogging, or discharge of exhaust gas is impeded. Therefore, the engine control portion 82 functionally includes a regeneration control portion 83 that executes a GPF regeneration control CNgpf in order to avoid or suppress a functional loss of the engine 12 due to excessive accumulation of the PM in the GPF 58. The functional loss of the engine 12 due to the excessive accumulation of the PM is, for example, a decrease in the output of the engine 12 due to an increase in the pressure loss of the exhaust gas, reduction of fuel efficiency, or the like. The regeneration control portion 83 executes a GPF regeneration control CNgpf for regenerating the GPF 58 by burning and removing the PM collected in the GPF 58 during running of the vehicle 10, by controlling the engine 12. The GPF regeneration control CNgpf is a regeneration control for regenerating the GPF 58 by controlling the engine 12 such that the PM collected in the GPF 58 is easily burned.

The regeneration control portion 83 determines whether or not at least a predetermined amount Qpmf of the PM is deposited in the GPF 58. The regeneration control portion 83 estimates a deposited amount Qpm of the PM deposited in the GPF 58 based on vehicular conditions such as a running distance of the vehicle 10, an operating time of the engine 12 and a load of the engine 12. The regeneration control portion 83 determines whether or not at least the predetermined amount Qpmf of the PM is deposited in the GPF 58, depending on whether or not the deposition amount Qpm is the predetermined amount Qpmf or more. The predetermined amount Qpmf is a predetermined value for determining that the regenerating of the GPF 58 is necessary. Alternatively, the regeneration control portion 83 may determine whether or not at least the predetermined amount Qpmf of the PM is deposited in the GPF 58, depending on whether or not a difference between pressures on upstream and downs sides of the GPF 58 is equal to or greater than a predetermined pressure value. The predetermined pressure value is a predetermined threshold value for determining that the pressure difference is such a pressure difference that flow of the exhaust gas is impeded and the engine performance is impaired, for example.

When the regeneration control portion 83 determines that at least the predetermined amount Qpmf of the PM is deposited in the GPF 58, the regeneration control portion 83 turns ON a request flag of the GPF regeneration control CNgpf and executes the GPF regeneration control CNgpf. When it is determined that the at least the predetermined amount Qpmf of the PM is not deposited in the GPF 58, the regeneration control portion 83 inhibits request of the GPF regeneration control CNgpf and does not executes the GPF regeneration control CNgpf.

The regeneration control portion 83 executes the GPF regeneration control CNgpf by executing a retard control CNrtd for controlling an ignition timing of the engine 12 to a retard side and a lean control CNlnb for controlling an air-fuel ratio to a lean side. The air-fuel ratio is a mass ratio of the air to the fuel (=air/fuel ratio) supplied to the engine 12. The lean side is a side in which the ratio of the air is more and the ratio of the fuel is less compared to a theoretical air-fuel ratio. A temperature of the exhaust gas sent to the GPF 58 is made easy to rise by the retard control CNrtd. An amount of oxygen contained in the exhaust gas sent to the GPF 58 is made to be easily increased by the lean control CNlnb. The PM collected in the GPF 58 is made easy to burn by the retard control CNrtd and the lean control CNlnb. The regeneration control portion 83 may execute the GPF regeneration control CNgpf by executing at least the lean control CNlnb.

By the way, when the GPF regeneration control CNgpf is executed in order to regenerate the GPF 58 by burning the PM deposited in the GPF 58, torque fluctuation in each combustion cycle of the engine 12 is increased, and there is a possibility that the NV of the vehicle may be increased. Therefore, it is difficult to balance the opportunity to regenerate the GPF 58 and the suppression of the increase of the NV. In particular, in a vehicle that emit a large amount of the PM, it is necessary to increase the opportunity to regenerate the GPF 58, and the above problem is significant.

When the power of the engine 12 is transmitted in a rigid body manner through the LU clutch 36 that is in the engaged state, the torque fluctuation of the engine 12 is more easily transmitted than when the power of the engine 12 is transmitted by a fluid through the torque converter 20 that is in the released state. Therefore, when the GPF regeneration control CNgpf is being executed, the electronic control apparatus 80 transmits the power of the engine 12 by fluid transmission through the torque convertor 20 and suppresses transmission of the torque fluctuation of the engine 12 in order to suppress increase of the NV. That is, the clutch control portion 84 executes a release control CNrls for releasing the LU clutch 36 when the GPF regeneration control CNgpf is executed. For example, when the regeneration control portion 83 determines that at least the predetermined amount Qpmf of the PM is deposited in the GPF 58, the clutch control portion 84 turns ON a request flag of the release control CNrls and executes the release control CNrls.

When the LU clutch 36 is engaged, fuel efficiency is improved and drivability such as acceleration responsiveness and direct feeling is improved, as compared with the case in which the LU clutch 36 is released. Therefore, the release control CNrls may be executed in a limited manner.

For example, normally, the engaged state of the LU clutch 36 is allowed when the warm-up is completed. If the LU clutch 36 is released from the engaged state after the completion of the warm-up, the driver may feel a sense of discomfort. In order to avoid or suppress such a sense of discomfort, the clutch control portion 84 determines whether or not the warm-up is completed, and when the warm-up is completed, the clutch control portion 84 cancels the request for the release control CNrls and does not execute the release control CNrls.

The clutch control portion 84 determines whether the warm-up is completed, for example, depending on whether the engine oil temperature THeol is equal to or higher than a predetermined engine oil temperature THeolf. Alternatively, the clutch control portion 84 determines whether the warm-up is completed, for example, depending on whether the engine coolant temperature THclt is equal to or higher than a predetermined engine coolant temperature THcltf. Alternatively, the clutch control portion 84 determines whether the warm-up is completed, for example, depending on whether the working fluid temperature THfld is equal to or higher than a predetermined working fluid temperature THfldf. The predetermined engine oil temperature THeolf, the predetermined engine coolant temperature THcltf and the predetermined working fluid temperature THfldf are, for example, predetermined temperature values THf for determining that the warm-up is completed. In this way, the clutch control portion 84 inhibits the release control CNrls when the temperature of the engine 12 (the engine oil temperature THeol, the engine coolant temperature THclt) or the working fluid temperature THfld is equal to or higher than the predetermined temperature values THf at which it is determined that the warm-up is completed.

Further, for example, during one trip, if the LU clutch 36 is engaged or released in substantially the same traveling state, the driver may feel discomfort. In order to avoid or suppress such a sense of discomfort, the clutch control portion 84 determines whether or not there is a history of the LU clutch 36 being in the engaged state during one trip, namely, there is an L/U history during one trip, and inhibits the release control CNrls during the one trip when there is the L/U history. The one trip corresponds to, for example, a period from when a power supply of the vehicle 10 is placed into an ON state for vehicle traveling to when the power supply of the vehicle 10 is placed into an OFF state for vehicle parking. The ON state of the power supply of the vehicle 10 is, for example, an ignition-ON state, and the OFF state of the power supply of the vehicle 10 is, for example, an ignition-OFF state. In this way, when there is the L/U history since the power supply of the vehicle 10 is placed into the ON state, the clutch control portion 84 inhibits the release control CNrls when the power supply of the vehicle 10 is in the ON state.

Further, for example, it is not preferable that a period of time during which the vehicle travels in the released state of the LU clutch 36 becomes long in one trip. Therefore, the clutch control portion 84 determines whether or not there is a history of traveling for at least a predetermined traveling time TMf in the release state of the LU clutch 36 during one trip, and inhibits the release control CNrls during the one trip when there is the history of traveling for at least the predetermined traveling time TMf. The predetermined traveling time TMf is, for example, a predetermined threshold value for determining that the traveling time in the released state of the LU clutch 36 is long. In this way, the clutch control portion 84 inhibits the release control CNrls when the power supply of the vehicle 10 is in the ON state, in a case in which the vehicle 10 has traveled with the LU clutch 36 being in the released state for at least the predetermined traveling time TMf after the power supply had been placed into the ON state, When the release control CNrls is inhibited, the power of the engine 12 cannot be transmitted by the fluid transmission through the torque convertor 20, and thus the regeneration control portion 83 inhibits the request for the GPF regeneration control CNgpf and does not execute the GPF regeneration control CNgpf. In this way, the regeneration control portion 83 inhibits the GPF regeneration control CNgpf when the release control CNrls is inhibited.

When the opportunity to regenerate the GPF 58 is sufficiently secured, the GPF regeneration control CNgpf is not required to be executed any more. This is the same even when at least the predetermined amount Qpmf of the PM is deposited in the GPF 58. The regeneration control portion 83 determines whether or not there is a history that the vehicle 10 has traveled with execution of the GPF regeneration control CNgpf for at least a predetermined period PTf. Even when it is determined that at least the predetermined amount Qpmf of the PM is deposited in the GPF 58, the regeneration control portion 83 inhibits the request for the GPF regeneration control CNgpf and does not execute the GPF regeneration control CNgpf in a case in which there is the history of traveling with execution of the GPF regeneration control CNgpf for at least the predetermined period PTf. The predetermined period PTf is a predetermined threshold value for determining that the vehicle 10 is traveling in the GPF regeneration control CNgpf, with a sufficient opportunity to regenerate the GPF 58 is secured.

If the opportunity to regenerate the GPF 58 is sufficiently secured and the request for the GPF regeneration control CNgpf is not made, the release control CNrls does not need to be executed. The clutch control portion 84 inhibits the release control CNrls when the regeneration control portion 83 determines that there is a history that the vehicle has traveled with execution of the GPF regeneration control CNgpf for at least the predetermined period PTf. The inhibition of the GPF regeneration control CNgpf and the inhibition of the release control CNrls are one set. From another point of view, the request for the GPF regeneration control CNgpf and the request for the release control CNrls are one set.

Even when at least the predetermined amount Qpmf of the PM is not deposited in the GPF 58, or even when the release control CNrls is inhibited due to completion of the warm-up or the like, it is preferable that the GPF regeneration control CNgpf be executed when the regeneration of the GPF 58 is requested by an operation of the driver. When the GPF regeneration request signal Sgpf is outputted, the regeneration control portion 83 preferentially turns ON the request flag of the GPF regeneration control CNgpf and executes the GPF regeneration control CNgpf. When the GPF regeneration request signal Sgpf is outputted, the clutch control portion 84 preferentially turns ON the request flag of the release control CNrls and executes the release control CNrls.

When the GPF regeneration control CNgpf is terminated, the regeneration control portion 83 gradually releases the lean control CNlnb and the retard control CNrtd over a predetermined transition time TPf after the GPF regeneration control CNgpf is inhibited, that is, after the request of the GPF regeneration control CNgpf is terminated. The predetermined transition time TPf is, for example, a predetermined time for suppressing a shock associated with the release of the GPF regeneration control CNgpf.

When the GPF regeneration control CNgpf is inhibited and terminated by the regeneration control portion 83, the clutch control portion 84 determines whether or not a predetermined transition time TPf has elapsed from the termination of the request for the GPF regeneration control CNgpf by the regeneration control portion 83. When the clutch control portion 84 determines that the predetermined transition time TPf has elapsed from the termination of the request for the GPF regeneration control CNgpf by the regeneration control portion 83, the clutch control portion 84 cancels the request for the release control CNrls and terminates the release control CNrls. The release control CNrls is terminated after the GPF regeneration control CNgpf is completely terminated.

FIG. 2 is a flowchart for explaining a main part of the control operation of the electronic control apparatus 80, namely, a control routine that is executed for suppressing the increase of NV when the GPF regeneration control CNgpf is executed, and is repeatedly executed, for example.

As shown in FIG. 2, the control routine is initiated with step S10 corresponding to function of the regeneration control portion 83, which is implemented to determine whether or not the PM is deposited in the GPF 58 is less than the predetermined amount Qpmf. If the determination in step S10 is negative, it is determined whether or not there is the L/U history in step S20 corresponding to function of the clutch control portion 84. If the determination in step S20 is negative, it is determined whether or not there is a history that the vehicle has traveled with the GPF regeneration control CNgpf being executed, for at least the predetermined period PTf, in step S30 corresponding to function of the regeneration control portion 83. If the determination in step S30 is negative, in step S40 corresponding to function of the regeneration control portion 83, the request flag for the GPF regeneration control CNgpf is turned ON, so that the GPF regeneration control CNgpf is executed. Next, in step S50 corresponding to function of the clutch control portion 84, it is determined whether or not the engine oil temperature THeol is at least the predetermined engine oil temperature THeolf. If a negative determination is obtained in step S50, the control flow goes to step S60 corresponding to function of the clutch control portion 84, to determine whether the engine coolant temperature THclt is at least the predetermined engine coolant temperature THcltf. If a negative determination is obtained in step S60, the control flow goes to step S70 corresponding to function of the clutch control portion 84, to determine whether the working fluid temperature THfld (see "T/M OIL TEMPERATURE" in FIG. 2) is at least the predetermined working fluid temperature THfldf. If a negative determination is obtained in step S70, the clutch control portion 84 determines in step S80 whether the vehicle 10 has traveled with the LU clutch 36 being released for at least the predetermined time TMf. When any one of the determinations of the steps S50, S60, S70 and S80 is positive, the request for the GPF regeneration control CNgpf is inhibited in step S90 corresponding to function of the regeneration control portion 83. Next, in step S100 corresponding to function of the clutch control portion 84, it is determined whether or not the predetermined transition time TPf has elapsed from end of the request for the GPF regeneration control CNgpf. If the determination in this step S100 is positive, the request for the release control CNrls (see "L/U OFF CONTROL" in FIG. 2) is cancelled in step S110 corresponding to function of the clutch control portion 84. When any one of the determinations of the step S10, S20 and S30 is positive, or after the step S110, it is determined whether or not the request for the GPF regeneration control CNgpf by the user operation is absent in step S120 corresponding to function of the regeneration control portion 83. If the determination in step S120 is affirmative, the request for the GPF regeneration control CNgpf is inhibited in step S130 corresponding to function of the regeneration control portion 83. If a negative determination is obtained in any one of steps S80, S100 and S120, the release control CNrls request flag is turned ON in step S140 corresponding to function of the clutch control portion 84, and the release control CNrls is executed. Next, in step S150 corresponding to function of the regeneration control portion 83, the request flag of the GPF regeneration control CNgpf is turned ON, and the GPF regeneration control CNgpf is executed.

As described above, according to the present embodiment, the release control CNrls is executed when the GPF regeneration control CNgpf is executed. Thus, during execution of the GPF regeneration control CNgpf, the power of the engine 12 is not transmitted in a rigid body manner through the LU clutch 36, but is transmitted in a fluid manner through the torque convertor 20. Therefore, during the execution of the GPF regeneration control CNgpf, the torque fluctuation of the engine 12 transmitted to the rear stage side of the converter 20 is suppressed. Therefore, when the GPF regeneration control CNgpf is executed, it is possible to suppress the increase of the NV in the vehicle 10.

Further, according to the present embodiment, the regeneration control portion 83 executes the GPF regeneration control CNgpf by executing the retard control CNrtd and the lean control CNlnb or at least executing the lean control CNlnb. As a result, the PM collected in the GPF 58 is made easy to burn, and the GPF 58 is appropriately regenerated.

Further, according to the present embodiment, when the temperature of the engine 12 or the working fluid temperature THfld is equal to or higher than the predetermined temperature THf, the release control CNrls is inhibited. Thus, the driver is prevented or restrained from feeling discomfort due to the LU clutch 36 being placed in the released state after completion of the warm-up.

According to the present embodiment, in a case in which the L/U history is present after the power supply of the vehicle 10 is placed into the ON state, the release control CNrls is inhibited when the power supply of the vehicle 10 is being placed in the ON state. This avoids or suppresses the driver's discomfort caused by the LU clutch 36 being engaged and released in substantially the same traveling state during one trip.

According to the present embodiment, in a case in which the vehicle 10 has traveled with the LU clutch 36 being in the released state for at least the predetermined traveling time TMf after the power supply of the vehicle 10 had been placed into the ON state, the release control CNrls is inhibited when the power supply of the vehicle 10 is in the ON state. Thus, the period of traveling of the vehicle 10 with the LU clutch 36 being in the released state during one trip is avoided or suppressed from becoming long.

Further, according to the present embodiment, when the release control CNrls is inhibited, the GPF regeneration control CNgpf is inhibited. Thus, when the GPF regeneration control CNgpf is executed, the power of the engine 12 is prevented from being transmitted in a rigid body manner through the LU clutch 36.

Although the embodiment of the present invention has been described in detail with reference to the drawings, the present invention is also applicable to other aspects.

For example, in the above-described embodiment, the engine 12 is exemplified as the power source, but the present invention is not limited to this aspect. For example, an electric motor may be used as the power source in addition to the engine 12.

In the above-described embodiment, the control routine shown by the flowchart of FIG. 2 does not necessarily have to include all the steps, as long as the control routine includes at least the steps S140 and S150.

In the above-described embodiment, the planetary-gear-type automatic transmission is exemplified as the automatic transmission 22, but the invention is not limited to this aspect. For example, the automatic transmission 22 may be a known belt-type continuously variable transmission.

The present invention is applicable to any vehicles that include the engine 12, the GPF 58, the torque convertor 20 and the LU clutch 36 in the above-described embodiments. As the fluid transmission device, instead of the torque converter 20, for example, another fluid transmission device such as a fluid coupling without a torque amplification effect may be used.

The above description is merely one embodiment, and the present invention can be implemented in a mode in which various modifications and improvements are added based on the knowledge of those skilled in the art.

NOMENCLATURE OF ELEMENTS

10: vehicle
12: engine
14: drive wheel
20: torque converter (fluid transmission device)
20p: pump impeller (input member)
20t: turbine impeller (output member)
36: LU clutch (direct clutch)
58: GPF (filter)
80: electronic control apparatus (control apparatus)
83: regeneration control portion
84: clutch control portion
FLD: working fluid

What is claimed is:

1. A control apparatus for a vehicle that includes (i) drive wheels, (ii) an engine, (iii) a filter configured to collect particulate matters contained in exhaust gas of the engine, (iv) a fluid transmission device which is one of a torque converter and a fluid coupling and which is provided in a power transmission path between the engine and the drive wheels and (v) a direct clutch configured to connect between an input member and an output member of the fluid transmission device, the control apparatus comprising a processor configured to:
execute a regeneration control for regenerating the filter, by controlling the engine in a manner that facilitates burning of the particulate matters collected in the filter,
execute a release control for placing the direct clutch into a released state when the regeneration control is being executed,
inhibit the release control when a temperature of the engine or a temperature of a working fluid of the direct clutch is not lower than a predetermined temperature value at which it is determined that a warm-up is completed, and
inhibit the regeneration control when the release control is being inhibited.

2. The control apparatus according to claim 1,
wherein the processor is configured to execute the regeneration control by executing a lean control for controlling an air-fuel ratio a lean side.

3. The control apparatus according to claim 1,
wherein the processor is configured to inhibit the release control when a power supply of the vehicle is in an ON state, in a case in which the vehicle has traveled with the direct clutch being in the released state for at least a predetermined time after the power supply had been placed into the ON state, and
wherein the processor is configured to inhibit the regeneration control when the release control is being inhibited.

4. The control apparatus according to claim 1,
wherein the processor is configured to execute the regeneration control by executing a lean control for controlling an air-fuel ratio to a lean side and a retard control for controlling an ignition timing to a retard side.

5. A control apparatus for a vehicle that includes (i) drive wheels, (ii) an engine, (iii) a filter configured to collect particulate matters contained in exhaust gas of the engine, (iv) a fluid transmission device which is one of a torque converter and a fluid coupling and which is provided in a power transmission path between the engine and the drive wheels and (v) a direct clutch configured to connect between an input member and an output member of the fluid transmission device, the control apparatus comprising a processor configured to:
execute a regeneration control for regenerating the filter, by controlling the engine in a manner that facilitates burning of the particulate matters collected in the filter,
execute a release control for placing the direct clutch into a released state when the regeneration control is being executed,
inhibit the release control when a power supply of the vehicle is in an ON state, in a case in which there is a history that the direct clutch has been placed into an engaged state after the power supply had been placed into the ON state, and
inhibit the regeneration control when the release control is being inhibited.

6. The control apparatus according to claim 5,
wherein the processor is configured to inhibit the release control when a power supply of the vehicle is in an ON state, in a case in which the vehicle has traveled with the direct clutch being in the released state for at least a predetermined time after the power supply had been placed into the ON state, and
wherein the processor is configured to inhibit the regeneration control when the release control is being inhibited.

7. The control apparatus according to claim 5,
wherein the processor is configured to execute the regeneration control by executing a lean control for controlling an air-fuel ratio to a lean side.

8. The control apparatus according to claim 5,
wherein the processor is configured to execute the regeneration control by executing a lean control for controlling an air-fuel ratio to a lean side and a retard control for controlling an ignition timing to a retard side.

* * * * *